US000001436H

United States Statutory Invention Registration [19]

[11] Reg. Number: H1436

Kersey et al.

[43] Published: May 2, 1995

[54] INTERFEROMETRIC FIBER OPTIC SENSOR CONFIGURATION WITH PUMP-INDUCED PHASE CARRIER

[76] Inventors: Alan D. Kersey, 9035 Silvercreek Ct., Fairfax Station, Va. 22039; Carl A. Villarruel, 10007 Whidbey La., Burke, Va. 22015

[21] Appl. No.: 959,584

[22] Filed: Oct. 13, 1992

[51] Int. Cl.[6] ..... G01B 9/02

[52] U.S. Cl. ..... 356/345; 356/349; 250/227.19; 250/227.27

[58] Field of Search ..... 356/345, 349, 361; 250/227.19, 227.27

[56] References Cited

U.S. PATENT DOCUMENTS 5,104,222 4/1992 Kersey et al. ..... 356/345

FOREIGN PATENT DOCUMENTS 9015980 12/1990 WIPO .

OTHER PUBLICATIONS

Publication "Measurement of Pump Induced Refractive Index Change in Erbium Doped Fiber Amplifier", by S. C. Fleming et al., *Electronics Letters*, vol. 27, No. 21, 10th Oct. 1991, pp. 1959–1961.

*Primary Examiner*—Bernarr E. Gregory

[57] ABSTRACT

An interferometric fiber optic sensor and method are provided for controlling the optical phase of a fiber interferometer by an optically induced change in the refractive index for one arm of the fiber interferometer and providing a passive all-optical phase shift interrogation in response to this dependency on the optically induced change in the refractive index. The interferometric fiber optic sensor includes a laser source for generating light at a first predetermined wavelength, a fiber interferometer coupled to the laser source and having first and second fiber arms with a predetermined optical path difference between the fiber arms, a predetermined one of the first and second fiber arms being doped with an element for introducing an optically adjustable absorption spectrum, and a pump laser coupled to the predetermined fiber arm for generating light at a second predetermined wavelength so that an effective index for a guided mode in the predetermined fiber arm and a phase delay of the light passing through the fiber interferometer are changed. As a result, the interferometric fiber optic sensor and method allows the phase interrogation of the fiber interferometer by using a passive all-optical approach based on a pump induced refractive index change in the doped fiber arm so that balanced all fiber interferometer elements are used as sensors for eliminating laser induced phase noise.

19 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIME-VARYING FIELD 92
WDM COUPLER (B) 140
SENSING FIBER 30
REFERENCE FIBER 31
INTERFEROMETER OPTICAL OUTPUT $I_I$
BALANCED MACH-ZEHNDER INTERFEROMETER 20
COUPLER 40
DOPED FIBER SECTION (x-x) 60
86
84
WDM COUPLER (A) 130
λo
λpump
90
PROBE LASER
PUMP LASER
MODULATOR
SINE/COSINE PROCESSOR
$\phi_s - \phi_r$
10
80
81

COUPLING
1→3
1→4
λpump
λo
λ

INTERFEROMETRIC FIBER OPTIC SENSOR CONFIGURATION WITH PUMP-INDUCED PHASE CARRIER

BACKGROUND OF THE INVENTION

1. Field of the Invention

The present invention relates to a fiber interferometer and more particularly to the control of the optical phase of a fiber interferometer of an interferometric fiber optic sensor by an optically induced change in the refractive index of the fiber in one arm of the fiber interferometer and utilizing the dependency of this optically induced change to provide passive-all optical phase shift interrogation.

2. Description of Related Art

Interferometric fiber optic sensors are known to be highly sensitive devices for measuring weak time varying fields such as acoustic pressure, vibration, magnetic fields, etc. because of their geometric versatility in the sensing element, wide dynamic range and extremely high sensitivity. The advantages which result from using the interferometric fiber optic sensors are attributed to the fact that the measurement technique employed measures the optical phase in the interferometer.

To achieve remote passive optical interrogation of fiber interferometers, a number of "demodulation" techniques based on phase generated carrier (PGC) concepts exist. These demodulation techniques conventionally use an unbalanced interferometer and laser frequency modulation to induce high frequency phase shift "carriers" in the interference output of the interferometric fiber optic sensor and the high frequency phase shift carriers are encoded by the lower frequency "signal" phase-shift information of interest. A passive (sine/cosine) homodyne technique, which requires some form of phase compensation to eliminate predetection signal fading caused by random differential temperature or mechanical fluctuations encountered by interferometers operating in normal environments, and a synthetic heterodyne technique, which has an infinite range because no pre-detection signal fading occurs but requires additional bulky and expensive optical components to produce the carrier signal in the interferometer output, are both possible in conventional interferometric sensors.

However, a problem of laser frequency jitter (induced phase noise) occurs when using these conventional forms of demodulation. Due to the required use of an unbalanced interferometer for operation in the PGC demodulation scheme, the interferometer is also inherently susceptible to laser frequency jitter (laser phase noise). As a result, the phase sensitivity obtained in the conventional sensor system is limited.

SUMMARY OF THE INVENTION

An object of the present invention is provide an interferometric fiber optic sensor having its optical phase controlled by an optically induced change in the refractive index of one of the fiber arms and using this dependency on the optically induced change in the refractive index to provide a passive all-optical phase shift interrogation. The phase shift of a balanced interferometer is tuned by using a passive optical approach which can be used to perform phase generated carrier demodulation (sine/cosine) or synthetic heterodyne signal processing. This allows the detection of weak signal phase shift information of interest with high sensitivity in a remote phase modulated balanced sensed interferometer.

Another object of the present invention is to provide a method for controlling the optical phase of a balanced fiber interferometer by optically inducing change in the refractive index of one of the fiber arms and providing a passive all-optical phase shift interrogation in response to the dependency on this optically induced change in the refractive index of the one fiber arm.

The objects of the present invention are fulfilled by providing an interferometric fiber optic sensor comprising a laser source for generating light at a first predetermined wavelength, a fiber interferometer coupled to said laser source and having first (sensing) and second (reference) fiber arms with a predetermined optical path difference therebetween, a predetermined one of said fiber arms being doped with an element for introducing an optically adjustable absorption spectrum, a modulator and a pump laser coupled to said predetermined fiber arm and responsive to a modulation signal from the modulator 81 for generating light at a second predetermined wavelength so that an effective index for a guided mode in said predetermined fiber arm and a phase delay of the light passing through said fiber interferometer are changed.

In a preferred embodiment of the present invention, the fiber interferometer comprises a balanced Mach-Zehnder interferometer with said predetermined optical path difference between said first (sensing) and second (reference) fiber arms being zero. Furthermore, the predetermined fiber arm is doped with, for example, a rare-earth ion which effects an index modulation involving a change in the material dispersion which occurs with a change in the absorption spectrum of the medium. A fiber doped with a rare-earth ion has an adjustable absorption spectrum in this preferred embodiment.

In another preferred embodiment, the predetermined fiber arm is doped with Erbium ($Er^{3+}$) to introduce this optical absorption spectrum. The output of the fiber interferometer in the interferometric fiber optic sensor according to the present invention is $(\frac{1}{2})\ I_0[1+k\cos(\phi_s-\phi_r)]$ where $I_0$ is a source input intensity, k is a fringe visibility value and $\phi_s$ and $\phi_r$ are optical phase-shifts in the respective sensing (s) and reference (r), fiber arms which are given by $\phi_s=(2\pi/\lambda_0)n_sL_s$ and $\phi_r=(2\pi/\lambda_0)n_rL_r$ with $n_s$ and $n_r$ being effective indices of said fiber arms and $L_s$ and $L_r$ being the lengths L of the respective sensing (s) and reference (r) fiber arms.

The objects of the present invention are also fulfilled by providing a method for controlling the optical phase of a balanced fiber interferometer comprising the steps of optically inducing a change in a refractive index for one fiber arm of the fiber interferometer, and providing a passive all-optical phase-shift interrogation in response to said step of optically inducing the change in said refractive index. This method allows the phase interrogation of the fiber interferometer by using a passive all-optical approach based on a pump induced refractive index change in the doped fiber arm and also allows balanced all fiber interferometer elements to be used as sensors which thereby eliminates laser induced phase noise.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS OF THE INVENTION

Figure 1:
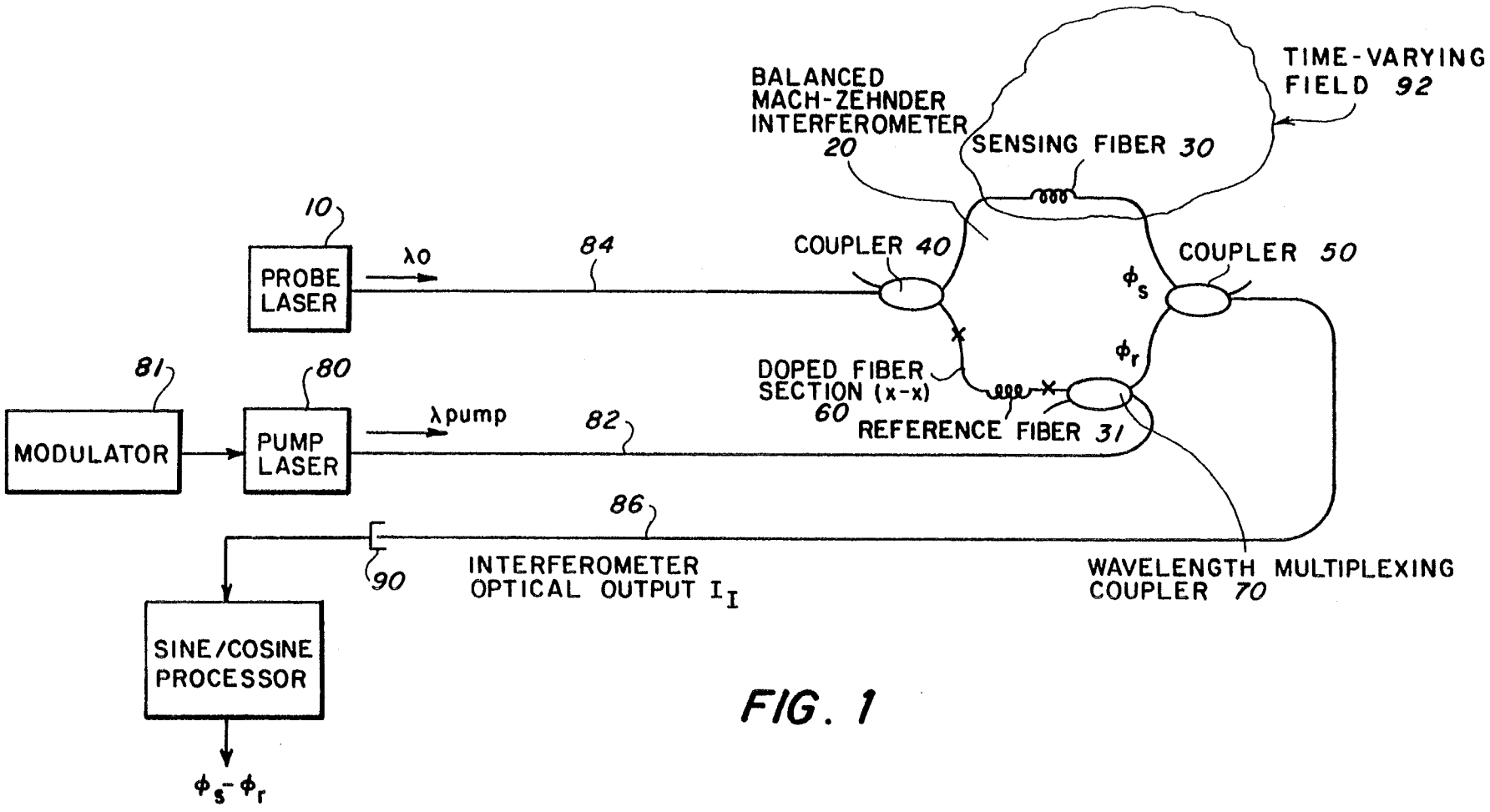
FIG. 1 illustrates an interferometric fiber optic sensor with a pump induced phase modulation via excited state absorption (ESA)–induced dispersion modification in one embodiment of the present invention.

A first embodiment of the present invention will be discussed by referring to FIGS. 1–4. FIG. 1 illustrates an interferometric fiber optic sensor with a pump-induced phase modulation via excited state absorption (ESA) induced dispersion modification. FIG. 1 illustrates a probe laser 10, which operates at a first predetermined wavelength of $\lambda_0$, for generating light, a fiber interferometer 20 coupled to the probe laser 10, a pump laser 80 for generating light at a second predetermined wavelength of $\lambda_{pump}$, a modulator 81 for modulating the pump power from the pump laser 80 and an interferometer optical output $I_I$ of the fiber interferometer 20 which is applied to a detector 90, with the detected output being demodulated by a sine/cosine processor 91 to produce the phase difference signal $\phi_s-\phi_r$. In a preferred embodiment of the present invention, the fiber interferometer 20 is a balanced Mach-Zehnder interferometer which includes sensing and reference fibers 30 and 31 as fiber arms. The input of the balanced Mach-Zehnder interferometer 20 is coupled to the probe laser 10 by a coupler 40, while the output $I_I$ of the balanced Mach-Zehnder interferometer 20 is coupled to the detector 90 by a coupler 50. As indicated before, the interferometric fiber optic sensor of FIG. 1 is utilized to measure a weak time-varying field 92 that may surround the sensing fiber or arm 30. Examples of such weak time-varying fields are acoustic pressure, vibration and a magnetic field. The balanced Mach-Zehnder interferometer 20 includes a doped fiber section (x—x) 60 in one of the fiber arms for effecting an index modulation by using the change in the material dispersion which occurs with a change in the absorption spectrum of the medium. The doped fiber section 60 is coupled to the pump laser 80 by a wavelength multiplexing coupler 70.

The fiber interferometer 20 has an optical path difference (OPD) between the sensing and reference fiber arms 30 and 31 which can be set at any value to achieve a particular phase noise level. In this embodiment of the present invention, the fiber interferometer 20 is a balanced Mach-Zehnder interferometer which has an OPD of 0. The output of the interferometric fiber optic sensor is given by $I_I=(\frac{1}{2})I_0[1+k\cos(\phi_s-\phi_r)]$ where k is a fringe visibility value, $I_0$ is a source input intensity and $\phi_s$ and $\phi_r$ are the optical phase-shifts in the respective sensing and reference fiber arms 30 and 31 of the fiber interferometer 20. The optical phase-shifts $\phi_s$ and $\phi_r$ are given by $\phi_s=(2\pi/\lambda_0)n_sL_s$ and $\phi_r=(2\pi/\lambda_0)n_rL_r$, where $n_s$ and $n_r$ are the effective indices of the respective sensing and reference fiber arms, 30 and 31, $L_s$ and $L_r$ are the lengths of the respective sensing and reference fiber arms, and $L_s$ and $L_r$ are preferably equal. The phase-shift difference between the respective sensing and reference fiber arms 30 and 31 is controlled by the effective index for each fiber arm. A relatively small change in the effective index leads to an appreciable optical phase-shift. For example, in a balanced interferometer with one meter (1 m) fiber arms, a change of approximately $10^{-7}$ (0.1 ppm) in the effective index of one fiber arm gives rise to a 1 radian phase change at a wavelength of 633 nm.

This index modulation effect is responsive to the change in material dispersion which occurs from the change in the absorption spectrum of the medium. For example, a fiber doped with a rare-earth ion has an adjustable absorption spectrum wherein ground state absorption (GSA) spectrum is present if the fiber arm is not excited (pumped) with an absorbing wavelength. In contrast, when an absorbing wavelength is present, excited-state absorption (ESA) transitions become allowable from the metastable state so that the absorption spectrum is changed and the material dispersion is modified. As a result, these characteristics are used in the fiber interferometer 20 to change the effective index for the guided mode in one fiber arm of the fiber interferometer 20 so that the phase delay of the light passing through the fiber arm is changed.

Figure 2B:
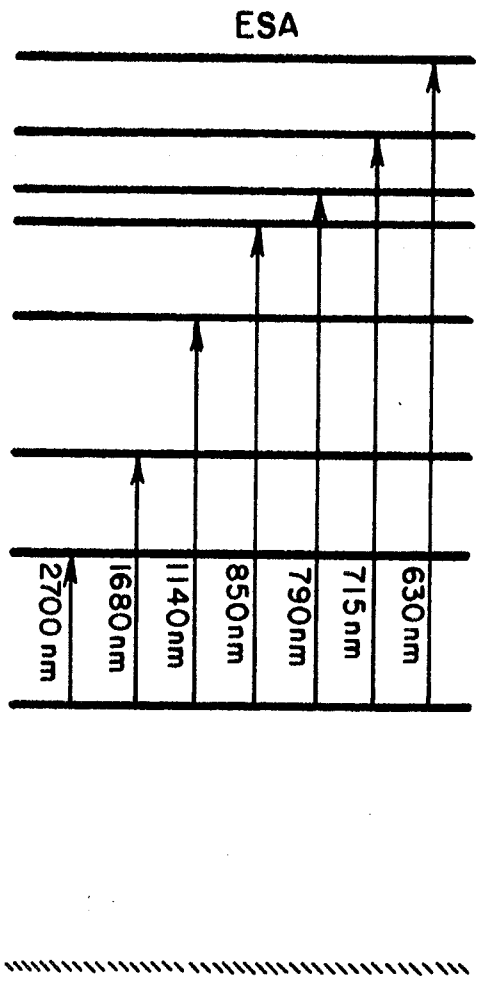
FIGS. 2(*a*) and 2(*b*) illustrate Erbium transitions from the ground state and excited state respectively.
Figure 2A:
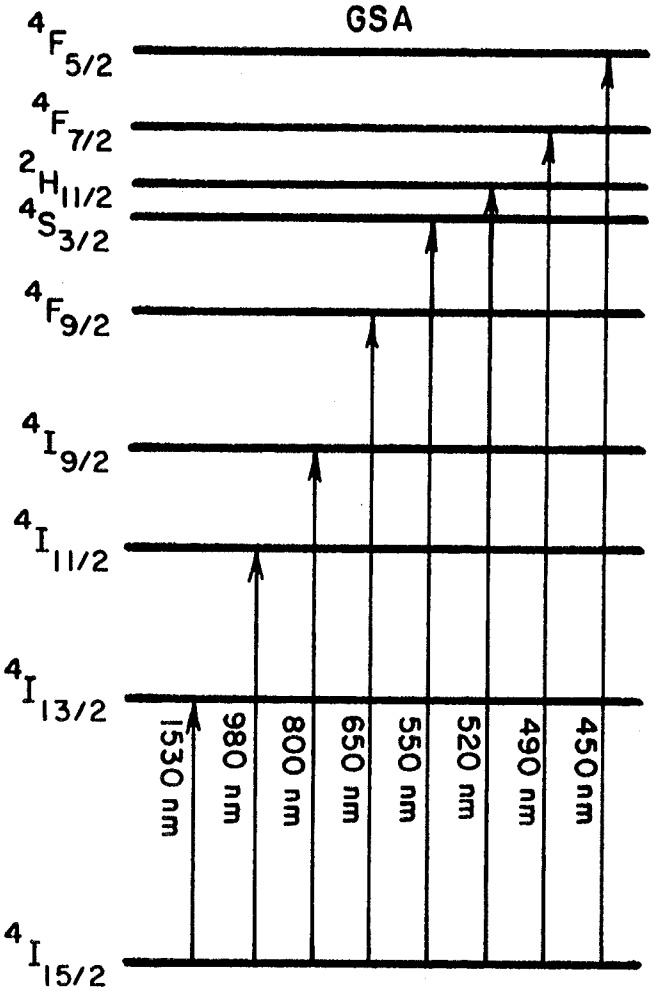
Figure 3A:
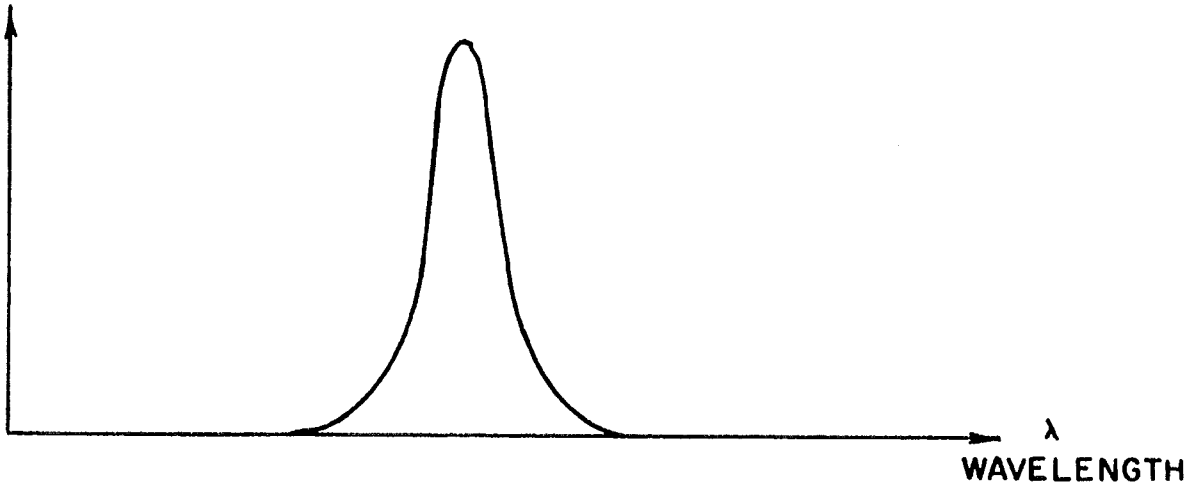
FIGS. 3(*a*) and 3(*b*) illustrate the absorption spectrum and material dispersion respectively, which are related via the Kramers-Kronig relationship.
Figure 3B:
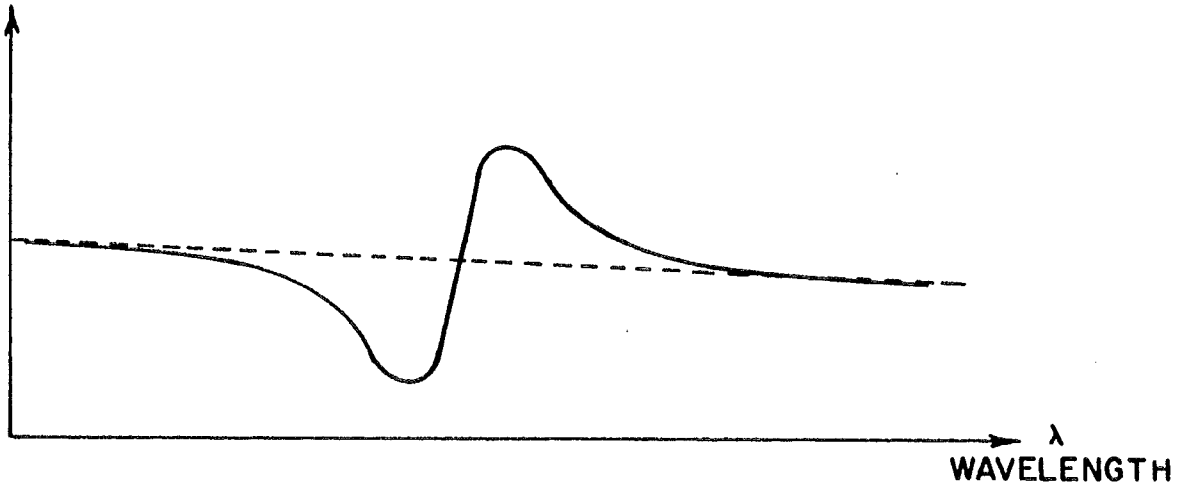

This index modulation effect is accomplished by co-doping the one fiber arm with an element which introduces an optically adjustable absorption spectrum, such as Erbium ($Er^{3+}$). FIGS. 2(*a*) and 2(*b*) illustrate the GSA and ESA transitions for Erbium. In the ground state, as illustrated in FIG. 2(*a*), the absorption characteristics result in absorption bands at 1530 nm (where the 1530 nm absorption band is a very broad absorption band ranging from 1470 nm to 1560 nm), 980 nm, 800 nm and several other lower visible wavelengths. The 1480 nm region of the absorption band ranging from 1470 nm to 1560 nm and the 980 nm absorption band are commonly used to pump Er doped fiber amplifiers and laser systems. ESA introduces several new absorption bands over the near IR wavelength range, as illustrated in FIG. 2(*b*). The absorption spectrum and material dispersion are the imaginary and real components, respectively, of the complex refractive index and are related via the well-known Kramers-Kronig relationship, as illustrated in FIGS. 3(*a*) and 3(*b*). Accordingly, changes in the absorption spectra result in changes of the index for the material and in particular, changes near the absorption bands.

Figure 4:
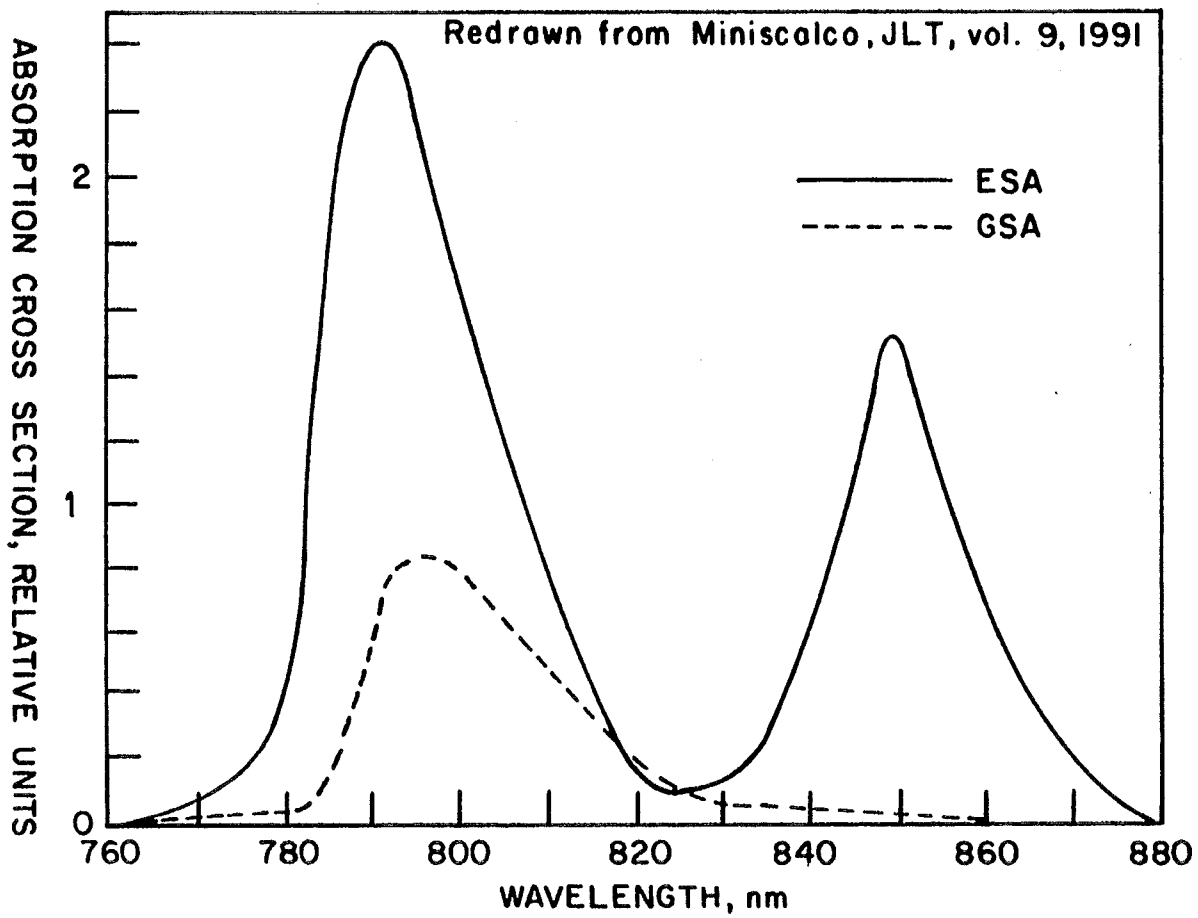
FIG. 4 illustrates ground state absorption (GSA) and ESA absorption spectra for Er doped Al/P silica fiber in the 760 to 880 nm range.

As an example, FIG. 4 illustrates a region where ESA lines introduce new strong absorption lines over the GSA spectrum. In particular, absorption bands in the 790 nm and 850 nm regions are formed due to ESA whereas the GSA spectrum has absorption bands at 800 to 810 nm. Thereby, for an operational wavelength in the 835 nm region, significant index changes are produced when the fiber is pumped. The shift depends on the population of the excited metastable state and the absorbed pump power. Consequently, the effective fiber index is tunable via the pump power.

A number of phase-shift demodulation approaches are known for interferometric sensors based on sinusoidal, serrodyne or square wave phase modulation functions. Each of these known phase-shift demodulation approaches can be implemented using the optical pump induced refractive index changes as described in the present embodiment. For example, if the pump power is modulated by the modulator 81 with a square waveform between 0 and a pump level $P_{\pi/2}$ sufficient to induce $\pi/2$ relative phase difference between the respective sensing and reference fiber arms 30 and 31, the interferometer output is of the form $I_I=(\frac{1}{2})I_0[1+k\cos(\phi_s-\phi_r+\Psi(t))]$, where $\Psi(t)=0$ or $\pi/2$ depending on the pump power (either 0 or $P_{\pi/2}$). Accordingly, the interferometer output $I_I$ is dependent upon cosine $(\phi_s-\phi_r)$ and sine $(\phi_s-\phi_r)$ for the two pump states. In other words, if the pump power from pump laser 80 is zero (which means that the modulator 81 is off), the interferometer output $I_I$ is dependent upon cosine $(\phi_s-\phi_r)$, whereas if the pump power is at $P_{\pi/2}$ then the interferometer output $I_I$ is dependent upon the sine $(\phi_s-\phi_r)$. After detection of these sine $(\phi_s-\phi_r)$ and cosine $(\phi_s-\phi_r)$ optical outputs by the detector 90, the resultant electrical outputs can be processed in a variety of ways to yield the phase difference $\phi_s-\phi_r$. In the case of sinusoidal or serrodyne (ramp) modulations, the linearity of the dependency of the pump induced phase-shift on the pump power dictates the form of the pump modulation function required to yield a true sinusoidal or linear phase variation in the interferometer and this can be accomplished by predistortion of the modulation waveform.

Figure 5A:
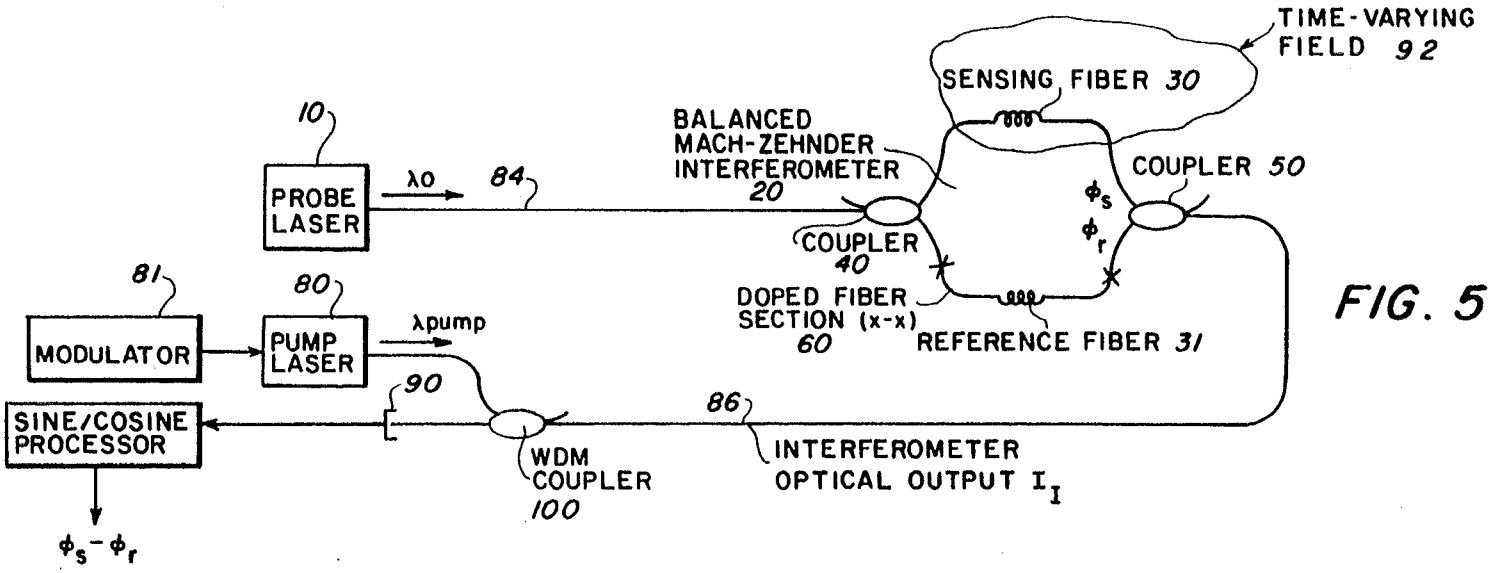
FIGS. 5(*a*) and 5(*b*) illustrate interferometric fiber optic sensors with pump induced phase modulations for additional embodiments of the present invention.
Figure 5B:
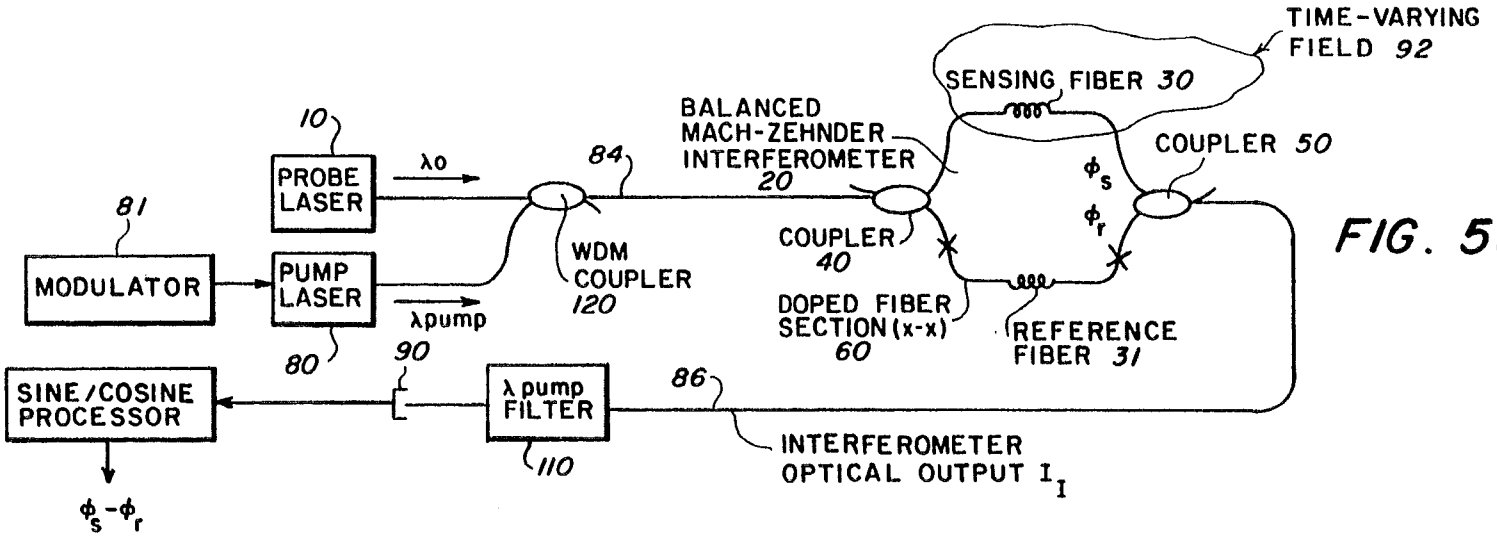

In the embodiment illustrated in FIG. 1, a separate fiber 82 is used to apply the optical pump power from the pump laser 80 to the interferometer 20. FIGS. 5(*a*) and 5(*b*) show two alternate methods which utilize the normal input and output fibers 84 and 86, respectively, of the interferometer 20 to convey the pump radiation to the doped fiber section 60. These two alternative embodiments use similar elements as described in FIG. 1 which will not be repeated for brevity and only the different elements will be described.

In FIGS. 5(*a*) and 5(*b*), the mode of operation provides that both the probe and pump wavelengths are supported by a common fiber. In FIG. 5(*a*), the pump laser 80 is serially coupled to the output fiber 86 and to the fiber interferometer 20 by a wavelength division multiplexing coupler 100, so that the output $\lambda_{pump}$ of the pump laser 80 is applied to the fiber interferometer 20 in an opposite direction to the output $\lambda_0$ from the probe laser 10. In FIG. 5(*b*), the pump laser 80 is coupled by way of input fiber 84 to the input of the fiber interferometer 20 and the probe laser 10 by a wavelength division multiplexing coupler 120 so that the output $\lambda_{pump}$ of the pump laser 80 and the output $\lambda_0$ of the probe laser 10 are in the same direction. The output $\lambda_{pump}$ of the pump laser 80, which is coupled to the fiber interferometer 20 and output therefrom, can be removed by using a $\lambda_{pump}$ filter 110 (fiber or bulk) as illustrated in FIG. 5(*b*) or a wavelength division multiplexing coupler (not shown). In FIGS. 5(*a*) and 5(*b*), the pump laser 80 is coupled to both of the sensing and reference fiber arms 30 and 31 of the fiber interferometer 20. In the undoped sensing fiber arm 30 of the fiber interferometer 20, the pump laser 80 has no effect and a differential pump induced phase-shift is still achieved.

Figures 6A, 6B, 6C, 6D, 6E:
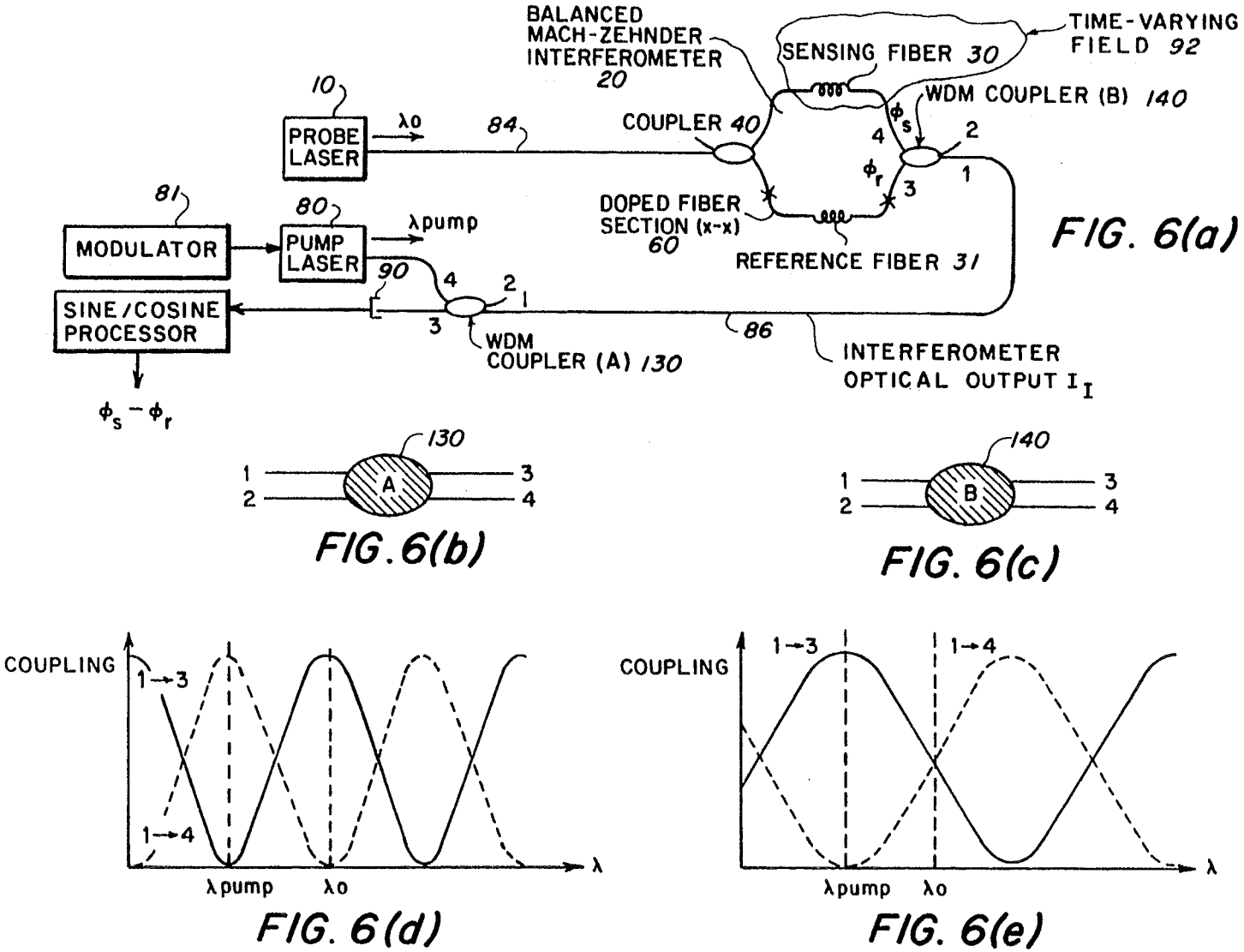
FIGS. 6(*a*)–6(*e*) illustrate an interferometric fiber optic sensor with pump induced phase modulation for another embodiment of the present invention with wavelength selective couplers in the interferometric fiber optic sensor along with illustrations of the improved pump coupling efficiency.

Another embodiment of the present invention is illustrated in FIG. 6(*a*). To improve the efficiency, the pump laser 80 can be selectively coupled to the doped reference fiber arm 31 of the fiber interferometer 20 by using a wavelength dependent coupler 140 as part of the fiber interferometer 20 which serves as a 50:50% splitter at the probe wavelength $\lambda_0$ but as a unidirectional coupler at the pump wavelength ($\lambda_{pump}$).

FIGS. 6(*b*) and 6(*c*) illustrate that at the pump wavelength, $\lambda_{pump}$, the coupling between port 1 and port 3 of the WDM coupler 130 of FIG. 6(*a*) is at a minimum and the coupling between port 1 and port 4 of the coupler 130 is at a maximum. FIGS. 6(*b*) and 6(*c*) also illustrate that at the probe wavelength, $\lambda_0$, the coupling between port 1 and port 3 of the WDM coupler 130 of FIG. 6(*a*) is at a maximum and the coupling between port 1 and port 4 of the coupler 130 is at a minimum.

FIGS. 6(*d*) and 6(*e*) illustrate that at the pump wavelength, $\lambda_{pump}$, the coupling between port 1 and port 3 of the WDM coupler 140 of FIG. 6(*a*) is at a maximum and the coupling between port 1 and port 4 of the coupler 140 is at a minimum. FIGS. 6(*d*) and 6(*e*) also illustrate that at the probe wavelength, $\lambda_0$, the two curves shown in the graph in FIG. 6(*e*) cross and at this point of crossing the couplings from port 1 to port 3 and from port 1 to port 4 are both equal to 50%.

An alternative means of demodulation tracks the interferometer phase difference by using the above-described approach over a limited range. A range of dopant materials is possible and the Erbium doped fiber is one example of a suitable material. The excited state lifetime determines the maximum modulation rate which can be achieved by using this approach. Accordingly, dopants with shorter lifetimes are more suitable for higher frequency modulation and the above-described approaches are suitable for use with other forms of interferometer configurations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed and desired to be secured by Letters Patent of the United States is:

1. An interferometric fiber optic sensor comprising:

a laser source for generating light at a first predetermined wavelength;

a balanced fiber interferometric for sensing a time-varying field to be measured, said balanced fiber interferometer coupled to said laser source and having first and second fiber arms, a predetermined one of said first and second fiber arms being doped with an element for introducing an optically adjustable absorption spectrum into said predetermined fiber arm when said predetermined fiber arm is pumped by light at a second predetermined wavelength;

means coupled to said predetermined fiber arm for selectively providing light at the second predetermined wavelength to produce a change in a refractive index of said predetermined fiber arm and a change in phase delay of the light passing through said balanced fiber interferometer to provide a passive all-optical phase shift interrogation of said balanced fiber interferometer; and means coupled to said balanced fiber interferometer being responsive to light passing through said balanced fiber interferometer with a changed phase delay for producing a demodulated output phase difference signal corresponding to the time-varying field being sensed.

2. The interferometric fiber optic sensor of claim 1 wherein:

said balanced fiber interferometer comprises a balanced Mach-Zehnder interferometer.

3. The interferometric fiber optic sensor of claim 2 wherein:

the output of said balanced fiber interferometer is $(\frac{1}{2})I_0[1+k\cos(\phi_s-\phi_r)]$ where $I_0$ is a source input intensity, k is a fringe visibility value and $\phi_s$ and $\phi_r$ are respective optical phase shifts in said first and second fiber arms which are given by $\phi_s=(2\pi/\lambda_0)n_sL_s$ and $\phi_r=(2\pi/\lambda_0)n_rL_r$ with $n_s$ and $n_r$ being respective effective indices of said first and second fiber arms and $L_s$ and $L_r$ being the respective lengths of said first and second fiber arms.

4. The interferometric fiber optic sensor of claim 1 wherein:

said predetermined fiber arm is doped with a rare-earth ion.

5. The interferometric fiber optic sensor of claim 1 wherein:

said predetermined fiber arm is doped with Erbium ($Er^{3+}$).

6. The interferometric fiber optic sensor of claim 1 further including:

means responsive to the light passing through said balanced fiber interferometer with the change in phase delay for producing a demodulated output phase difference signal corresponding to the time varying field being measured.

7. The interferometric fiber optic sensor of claim 6 wherein said producing means includes:

a detector for converting the light passing through said balanced fiber interferometer to an electrical signal corresponding to the phase difference between the light in said first and second fiber arms; and processor means for demodulating the electrical signal to produce an output signal corresponding to the time-varying field being sensed.

8. The interferometric fiber optic sensor of claim 1 wherein said selectively providing light means includes:

a pump laser coupled to said predetermined fiber arm for providing light at the second predetermined wavelength in an on mode of operation to provide a passive all-optical phase interrogation of said balanced fiber interferometer during said on mode of operation; and a modulator having on and off modes of operation for modulating said pump laser only during the on mode of operation to enable said pump laser to produce the second predetermined wavelength to provide the passive all-optical phase interrogation of said balanced fiber interferometer during the on mode of operation.

9. An interferometric fiber optic sensor comprising:

a laser source for generating light at a first predetermined wavelength;

a balanced fiber interferometer for sensing a time-varying field to be measured, said balanced fiber interferometer coupled to said laser source and having first and second fiber arms, a predetermined one of said first and second fiber arms being doped with an element for introducing an optically adjustable absorption spectrum into said predetermined fiber arm when said predetermined fiber arm is pumped by light at a second predetermined wavelength;

a pump laser for generating light at the second predetermined wavelength so that an effective index for a guided mode in said predetermined fiber arm and a phase delay of output light passing through said balanced fiber interferometer are changed;

a first wavelength division multiplexing coupler for applying light from said pump laser to said balanced fiber interferometer in the opposite direction to the light from said laser source;

a modulator for causing said pump laser to selectively generate and apply light at the second predetermined wavelength to said predetermined fiber arm to provide a passive all-optical phase shift interrogation of said balanced fiber interferometer; and means coupled to said balanced fiber interferometer being responsive to light passing through said balanced fiber interferometer with a changed phase delay for producing a demodulated output phase difference signal corresponding to the time-varying field being sensed.

10. The interferometric fiber optic sensor of claim 9 wherein:

said (balanced) fiber interferometer comprises a balanced Mach-Zehnder interferometer.

11. The interferometric fiber optic sensor of claim 10 wherein:

said balanced fiber interferometer comprises a second wavelength division multiplexing coupler for selectively coupling said pump laser to said predetermined fiber arm as a 50:50% splitter at said first predetermined wavelength and as a unidirectional coupler at said second predetermined wavelength.

12. The interferometric fiber optic sensor of claim 9 wherein:

said predetermined fiber arm is doped with a rare-earth ion.

13. The interferometric fiber optic sensor of claim 9 wherein:

said predetermined fiber arm is doped with Erbium ($Er^{3+}$).

14. An interferometric fiber optic sensor comprising:

a laser source for generating light at a first predetermined wavelength;

a pump laser for generating light at a second predetermined wavelength in the same direction as the light from said laser source;

a wavelength division multiplexing coupler for coupling the outputs from said laser source and said pump laser;

a balanced fiber interferometer for sensing a time-varying field to be measured, said balanced fiber interferometer being coupled to said wavelength division multiplexing coupler, said balanced fiber interferometer having first and second fiber arms, a predetermined one of said first and second arms being doped with an element for introducing an optically adjustable absorption spectrum into said predetermined fiber arm when said predetermined fiber arm is pumped by light at a second predetermined wavelength;

a modulator for modulating said pump laser during an on mode of operation to cause said pump laser to emit light at the second predetermined wavelength during the on mode of operation so that an effective index for a guided mode in said predetermined fiber arm and a phase delay of the light passing through said balanced fiber interferometer are changed in order to provide a passive all-optical phase shift interrogation of said fiber interferometer and to cause said pump laser to not emit light at the second predetermined wavelength during the off mode of operation; and a pump filter coupled to said balanced fiber interferometer for removing the light from said pump laser.

15. The interferometric fiber optic sensor of claim 14 wherein:

said balanced fiber interferometer comprises a balanced Mach-Zehnder interferometer.

16. The interferometric fiber optic sensor of claim 14 wherein:

said predetermined fiber arm is doped with a rear-earth ion.

17. The interferometric fiber optic sensor of claim 14 wherein:

said predetermined fiber arm is doped with Erbium ($Er^{3+}$).

18. A method for optically controlling the interrogation of a balanced fiber interferometer in an interferometric fiber optic sensor, said method comprising the steps of:

sensing in a sensing fiber arm of the balanced fiber interferometer a time-varying field to be measured;

optically inducing a selective change in a refractive index for one of the fiber arms of the fiber interferometer;

providing a passive all-optical phase shift interrogation of the balanced fiber interferometer in response to said step of optically inducing the selective change in said refractive index; and detecting and demodulating the output of the interrogated balanced fiber interferometer to produce an output phase difference signal corresponding to the time-varying field being sensed.

19. A method for optically controlling the interrogation of a balanced fiber interferometer having sensing and reference arms, said method comprising the steps of:

generating light at a first predetermined wavelength from a laser source;

coupling the balanced fiber interferometer to the laser source;

doping a predetermined one of the sensing and reference fiber arms with an element for introducing an optically adjustable absorption spectrum to the balanced fiber interferometer when the predetermined fiber arm is pumped by light at a second predetermined wavelength;

sensing in the sensing fiber arm of the balanced fiber interferometer a time-varying field to be measured;

selectively generating light at the second predetermined wavelength by a pump laser enabled by a modulator and coupled to the predetermined fiber arm to produce a phase delay in output light passing through the balanced fiber interferometer to provide a passive all-optical phase shift interrogation of the balanced fiber interferometer; and detecting and demodulating the output of the interrogated balanced fiber interferometer to produce an output phase difference signal corresponding to the time-varying field being sensed.

* * * * *